(12) United States Patent
Gandel et al.

(10) Patent No.: US 7,391,205 B2
(45) Date of Patent: Jun. 24, 2008

(54) ANGULAR POSITION MAGNETIC SENSOR DEVICE

(75) Inventors: Pierre Gandel, Montfaucon (FR); Daniel Prudham, Thise (FR); Didier Frachon, Besancon (FR); Bruno Cavallier, Saint-Vit (FR)

(73) Assignee: MMT S.A., Zug (CH)

( * ) Notice: Subject to any disclaimer, the term of this patent is extended or adjusted under 35 U.S.C. 154(b) by 0 days.

(21) Appl. No.: 10/509,327

(22) PCT Filed: Mar. 31, 2003

(86) PCT No.: PCT/FR03/00997

§ 371 (c)(1),
(2), (4) Date: Feb. 24, 2005

(87) PCT Pub. No.: WO03/085361

PCT Pub. Date: Oct. 16, 2003

(65) Prior Publication Data

US 2005/0140361 A1 Jun. 30, 2005

(30) Foreign Application Priority Data

Apr. 9, 2002 (FR) .................................. 02 04413

(51) Int. Cl.
*G01B 7/30* (2006.01)
*G01B 7/14* (2006.01)

(52) U.S. Cl. .............................. 324/207.25; 324/207.21; 324/207.2

(58) Field of Classification Search . 324/207.2–207.25, 324/173–174; 338/32 R, 32 H
See application file for complete search history.

(56) References Cited

U.S. PATENT DOCUMENTS

| 5,861,745 A | 1/1999 | Herden | |
|---|---|---|---|
| 6,448,761 B1 * | 9/2002 | Stumpe et al. | 324/207.2 |
| 6,593,734 B1 * | 7/2003 | Gandel et al. | 324/207.25 |
| 6,806,701 B2 * | 10/2004 | Apel et al. | 324/207.2 |
| 6,867,582 B2 * | 3/2005 | Muraji et al. | 324/207.2 |

FOREIGN PATENT DOCUMENTS

| DE | 101 39 154 | 2/2002 |
|---|---|---|
| WO | 01/20250 | 3/2001 |

\* cited by examiner

*Primary Examiner*—Reena Aurora
(74) *Attorney, Agent, or Firm*—Oblon, Spivak, McClelland, Maier & Neustadt, P.C.

(57) ABSTRACT

An angular-position magnetic-sensor device includes at least one stator and one rotor. A space between said stator and said rotor, defining over substantially 360°, is a main air gap including at least two movable magnetic poles of alternating polarities. The stator is provided with at least one secondary air gap in which there is placed at least one magnetosensitive element. The stator is composed of two pole shoes having angular widths that are substantially equal to 120° and 240° respectively, and the two magnetic poles each have an angular width substantially equal to 120°.

8 Claims, 3 Drawing Sheets

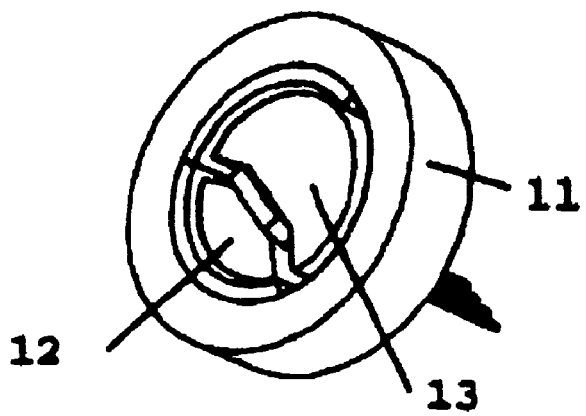
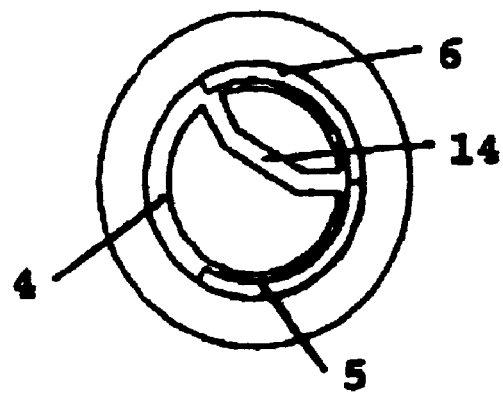
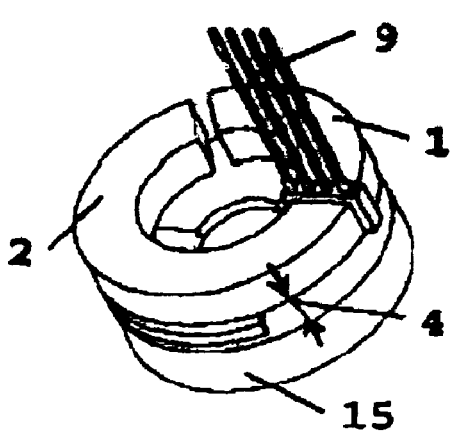
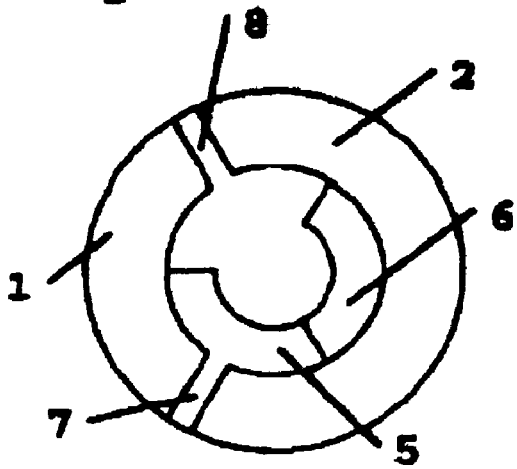
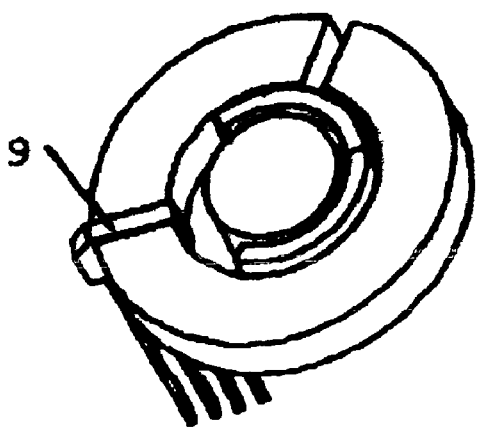
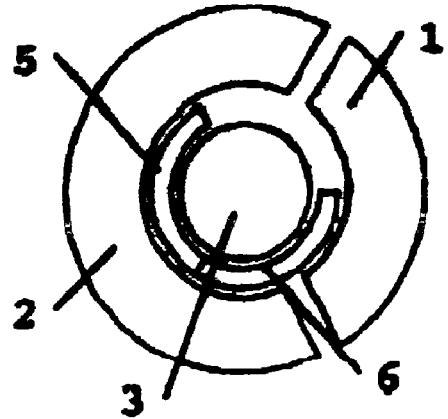

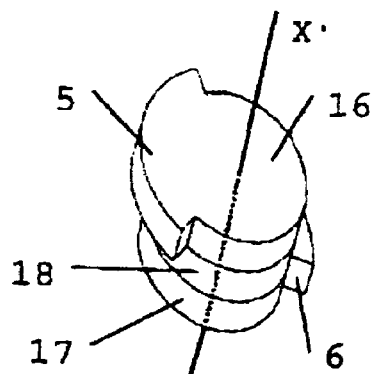
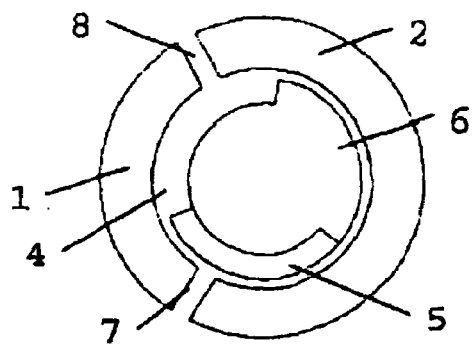
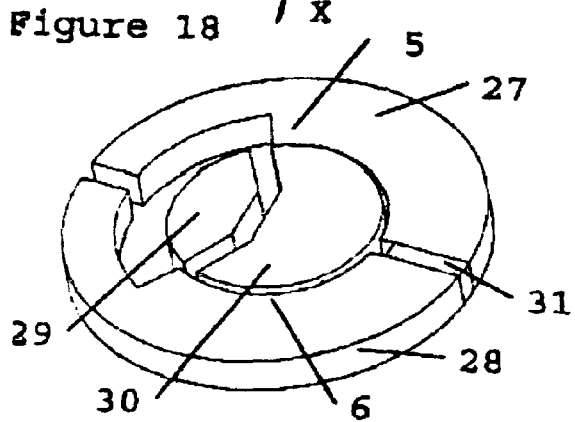
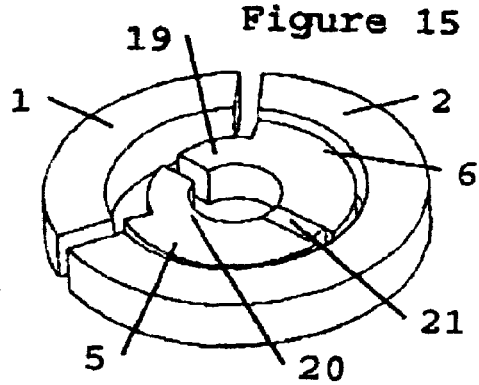
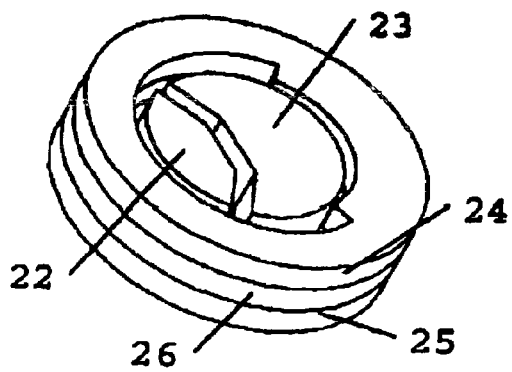
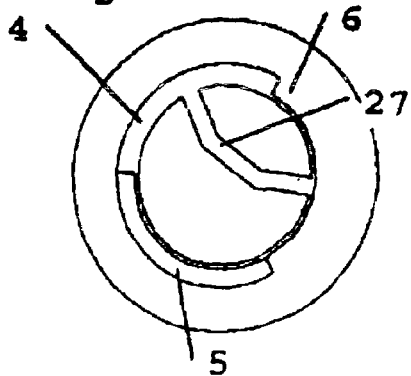

ANGULAR POSITION MAGNETIC SENSOR DEVICE

BACKGROUND OF THE INVENTION

1. Field of the Invention

The present invention relates to an angular-position magnetic-sensor device. It is applicable in particular but not exclusively to motorized butterfly valves (ETC), which require a very stable signal at the beginning of travel and a fairly large travel (larger than 90°) with excellent linearity.

2. Description of the Related Art

In general, contactless systems comprise substantially devices made from angular-position magnetic sensors. In all such devices, the measured signal must be as linear as possible according to angular position.

In order to make both the invention and the angular-position magnetic-sensor devices more comprehensible, it is important to understand the "zero gauss" concept.

The position delivering a signal equal to zero gauss corresponds to the point of high stability. In fact, the variation of induction is measured by means of an intelligent and programmable Hall-effect sensor of ASIC type. This sensor is capable of compensating for the effect of temperature (programming of a thermal coefficient) on the magnetic system. Such temperature compensation is not perfect, and therefore the only position for which this error has no influence is a position at which induction is zero.

French Patent Application No. 2670286 and European Patent Application No. 0665416, filed in the name of the Applicant, disclose a device in which the angular-position measurement function is achieved by variation of the magnetic induction, but propose a maximum travel of ±90° around the zero-gauss position. For sensors of the type presented in the aforesaid two patents, this travel is reduced to ±70° around the zero-gauss position in an attempt to obtain excellent linearity (typically ±0.5%). Since ETC applications generally necessitate a total travel of close to 90°, two options are possible:

the use of a symmetric angular range, such as [−45°; +45°], or the use of the angular range [−20°; +70°], so as to approach zero gauss.

Thus it is not possible in any of the cases to combine the following three characteristics:

a zero-gauss starting point (high-stability point), a usable angular travel greater than or equal to 90°, excellent linearity (±0.5%) over the chosen angular range.

In fact, if the interval [−20°; +70°], for example, is used, the starting point (−20°) does not operate at zero gauss but exhibits an offset, which is problematic for applications that necessitate a very stable starting point.

In the prior art there is also known U.S. Pat. No. 5,861,745, which describes a contactless detection device comprising a rotor and a stator. In the stator there is disposed a Hall element in an air gap having the form of a slit, and in the interior wall of the rotor there are disposed two annular magnets having mutually opposed magnetic polarities.

Within the scope of use of the angular sensor over the maximum travel (240°) and/or for applications of the ETC type, however, only two structures function theoretically, those illustrated in FIGS. 3 and 4, which are composed respectively of an interior stator configuration and an exterior stator configuration. These two devices exhibit the following characteristics: three pieces for the stator and two magnets that are magnetized radially, one (interior radial) over an angular extent of 120° and the other (exterior radial) over an angular extent of 240°.

At present, however, it is not technically feasible to magnetize a magnet correctly over an angular extent of 240°. This degradation of performances leads inevitably to poor linearity and, as it happens, linearity is the primary criterion for sensors of this type.

Finally, there is also known International Patent Application No. WO 0120250, which describes a measuring device for contactless detection of a relative motion, comprising 3 stator poles of approximately 120° by making of a hole in the large stator, with the objective of decreasing the leakage flux when the transition of the magnets is located in the configuration illustrated in particular in FIGS. 22, 23, 24a and 24c of the said application. Thus the device of that patent application does not permit operation in the angular phase [−120°; +120°], because the presence of the said hole induces an "accident" in the measured induction for the zone close to zero.

SUMMARY OF THE INVENTION

The object of the invention is therefore more particularly to remedy the disadvantages of the prior art devices. For this purpose it proposes an angular-position magnetic-sensor device provided with at least one stator and one rotor, the space between the said stator and the said rotor defining over substantially 360° a main air gap in which there move at least two magnetic poles of alternating polarities, the said stator being provided with at least one secondary air gap in which there is placed at least one magnetosensitive element, characterized in that the said stator is composed of two pole shoes having angular widths that are substantially equal to 120° and 240° respectively.

Furthermore, the two magnetic poles will each have an angular width substantially equal to 120°. Advantageously, the aforesaid two magnetic poles will be radially magnetized adjacent magnets.

In one embodiment of the invention, the rotor is situated in the interior of the stator.

In a second embodiment, the rotor is situated on the exterior of the stator.

According to one option presented by the invention, the sides of at least one of the said air gaps could be oriented radially, or in other words "in the form of radial slits", or be oriented in the same direction, or in other words "in the form of straight slits".

Preferably, the sides of the said air gap will be mutually parallel. In the same way, at least one of the said magnetic poles will be advantageously made of a soft ferromagnetic material.

At least one of the magnetic poles could be glued to the rotor or be an integral part of the said rotor.

According to another option, the rotor and stator could be disposed axially, or in other words along the same linear axis. In this case, the said magnetic poles will then be adjacent disc-shaped magnets that are magnetized axially, or in other words along the same linear axis.

The rotor also could comprise at least two axially separate parts, the two parts forming the rotor then being separated by an axially magnetized disc magnet. It will also be possible for the two parts to be separated by an axially magnetized magnet of annular shape.

According to another option presented by the invention, the rotor could comprise at least two transversely separate parts, the two parts forming the rotor then being separated by a transversely magnetized parallelepiped magnet.

In the case in which the rotor is situated on the exterior of the stator, the rotor could comprise at least two parts separated transversely by a transversely magnetized magnet, which magnet can have parallelepiped shape.

By virtue of these features, the invention therefore makes it possible to manufacture, at low cost, an angular-position sensor capable of operating with a linearity of ±0.5% over a travel of 100° starting from the zero-gauss point, and extends the travel from ±90° to ±120°. Thus this sensor exhibits the following characteristics:

- linearity on the order of 1% peak-to-peak,
- delivery of a signal having good linearity over a range of 220°,
- a stator part reduced to two pieces,
- two magnetic poles that are magnetized preferentially radially over an angular range substantially equal to 120°, easier to use industrially.

BRIEF DESCRIPTION OF THE DRAWINGS

By way of non-limitative example, embodiments of the invention will be described hereinafter with reference to the attached drawings, wherein:

FIGS. 7 and 8 respectively illustrate a perspective view and an overhead view in horizontal projection of another embodiment of the device according to the invention, wherein the rotor is placed on the exterior of the stator;

FIGS. 9 and 10 respectively illustrate a perspective view and an overhead view in horizontal projection of another embodiment of the device according to the invention, wherein the magnetic poles are of the disc type;

FIGS. 11 and 12 respectively illustrate a perspective view and an overhead view in horizontal projection of another embodiment of the device according to the invention, wherein the magnetic poles are independent of the rotor;

FIGS. 13 and 14 respectively illustrate a perspective view and an overhead view in horizontal projection of another embodiment of the device according to the invention, wherein the rotor is axially separated by an axially magnetized disc magnet;

FIG. 15 illustrates a perspective view of a device according to the invention, wherein the rotor is transversely separated by a transversely magnetized magnet;

FIGS. 16 and 17 respectively illustrate a perspective view and an overhead view in horizontal projection of another embodiment of the device according to the invention, wherein the rotor is disposed on the exterior of the stator and is separated axially by an axially magnetized annular magnet;

FIG. 18 illustrates a perspective view of a device according to the invention, wherein the rotor, disposed on the exterior of the stator, is separated transversely by a transversely magnetized magnet.

DETAILED DESCRIPTION OF THE INVENTION

The angular-position magnetic-sensor device according to the invention comprises, in all examples presented hereinafter as necessary for comprehension and illustration of the different versions of the invention, a stator and a rotor of soft ferromagnetic material as well as two magnetic poles of alternate polarities. A magnetosensitive element, such as a Hall sensor, lodged in a secondary air gap of the stator, measures the induction and makes it possible to obtain the angular position of the rotor relative to the stator.

Furthermore, as is evident in the different figures, regardless of whether the stator is placed on the exterior or in the interior of the rotor, it is always composed of two pole shoes 1, 2 of angular widths substantially equal to 120° and 240° respectively.

Figure 1:
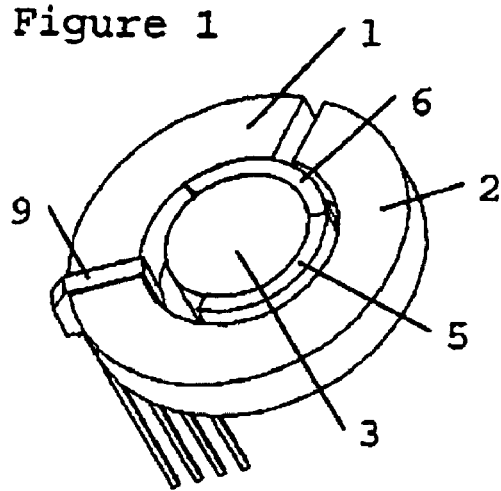
FIG. 1 illustrates a perspective view of an angular-position magnetic-sensor device according to the invention.
Figure 2:
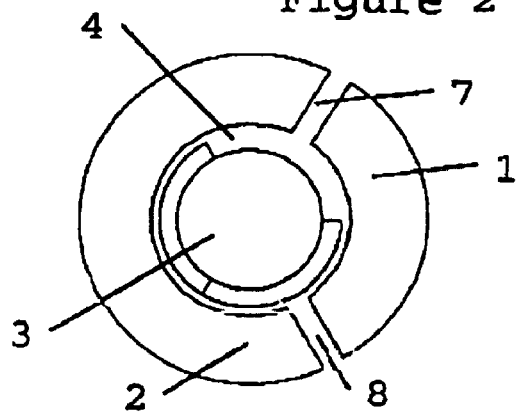
FIG. 2 is an overhead view in horizontal projection of the device illustrated in FIG. 1.

In an embodiment illustrated in FIGS. 1 and 2, the position-sensor device according to the invention is provided with a stator 1, 2, in the interior of which there is lodged a rotor 3. The space existing between stator 1, 2 and rotor 3 defines main air gap 4, which extends over 360° and in which there move two adjacent magnetic poles 5 and 6 or magnets, which are radially magnetized and have alternate polarities, the said magnets, which are integral with a coupling means, being capable of being glued to the rotor.

Stator 1, 2 is composed of two fixed parts 1 and 2, defining two secondary air gaps 7 and 8, the sides of which, mutually parallel in pairs, are oriented radially. The two secondary air gaps 7 and 8 are substantially perpendicular to main air gap 4, and magnetosensitive element 9, lodged in at least one of the said secondary air gaps 7, 8, measures the variation of induction. This magnetosensitive element 9 generates an electric signal proportional to the induction passing through it.

Figure 3:
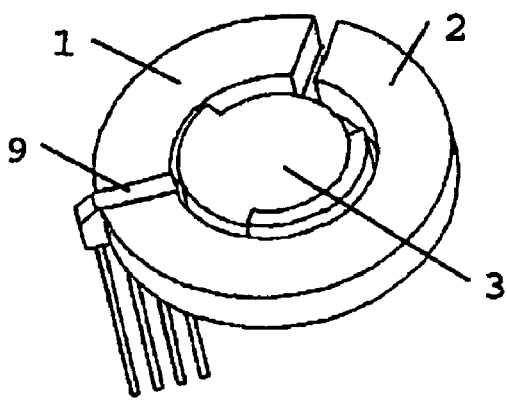
FIGS. 3 and 4 respectively illustrate a perspective view and an overhead view in horizontal projection of another embodiment of the device according to the invention, wherein the rotor is placed in the interior of the stator.
Figure 4:
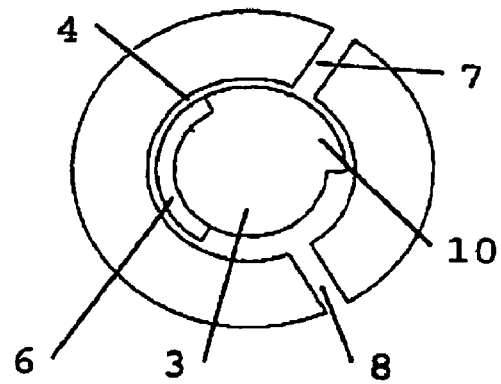

FIGS. 3 and 4 illustrate another version of the angular-position magnetic-sensor device illustrated in FIGS. 1 and 2. In fact, in this version, one of the magnets defining one of the two magnetic poles of angular width substantially equal to 120° is replaced by a soft ferromagnetic material. In addition, in the same manner as in the foregoing, rotor 3 is disposed in the interior of stator 1, 2 and the parallel sides of secondary air gaps 7, 8 are oriented radially, in accordance with a known configuration referred to as "in the form of radial slits".

According to an option presented by the invention, the magnetic poles can be glued to rotor 3 or can be an integral part of rotor 3. In the example illustrated in FIG. 4, magnetic pole 10 formed by the soft ferromagnetic material is therefore an integral part of rotor 3.

Figure 5:
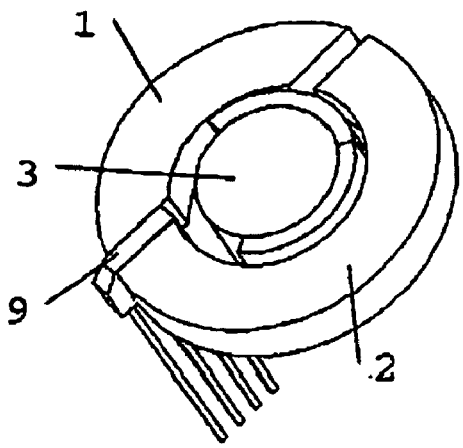
FIGS. 5 and 6 respectively illustrate a perspective view and an overhead view in horizontal projection of another version of the device illustrated in FIGS. 3 and 4.
Figure 6:
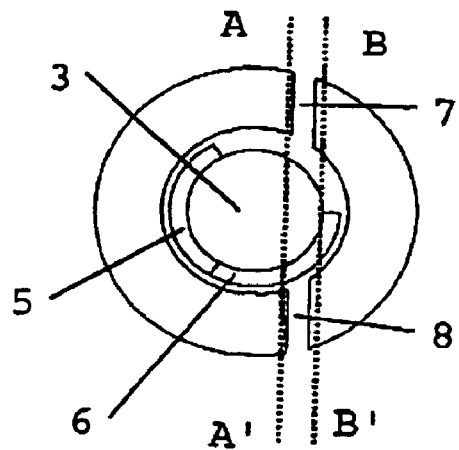

In the same manner, an embodiment of the device according to the invention as illustrated in FIGS. 5 and 6 could be envisaged, wherein secondary air gaps 7 and 8, whose sides as seen in the foregoing are ideally parallel, are oriented in the same direction, in other words, the said sides respectively extend according to two parallel straight lines A'A and B'B, as are evident in FIG. 6.

Of course, the case in which the sides of the secondary air gaps are not parallel, without significant alternation of the properties of the device according to the invention, also could be imagined. Moreover, for considerations of construction and production, it will be understood that it is easier to provide that the opposite sides of magnetic poles 5, 6 or 6, 10 be parallel.

In a second embodiment of the device according to the invention, the position sensor is provided with a rotor 11, in the interior of which there is lodged a stator 12, 13.

In the same manner as in the foregoing, the space between the said stator 12, 13 and the said rotor 11 defines main air gap 4, which extends over 360° and in which there move two adjacent magnets 5, 6, magnetized radially and of alternate polarity. In equivalent fashion, the said magnets 5 and 6, integral with a coupling means, can be glued to rotor 11 or can be an integral part thereof. The two magnets 5, 6 comprise two magnetic poles of angular width substantially equal to 120°.

Stator 12, 13 in this case is composed of two fixed parts 12 and 13, wherein the space separating them defines a secondary air gap 14 and the two ends of which are substantially perpendicular to main air gap 4. Magnetosensitive element 9, lodged in secondary air gap 14, measures the variation of induction. This magnetosensitive element 9 generates an electric signal proportional to the induction passing through it.

As in the foregoing, it could be imagined that at least one of magnetic poles 5 or 6 of width substantially equal to 120° is replaced by a soft ferromagnetic material.

In an embodiment of the device according to the invention, stator 1, 2 and rotor 15 are disposed axially. The separation space between stator 1, 2 and rotor 15 defines main air gap 4, which extends over 360° and in which there move two magnets 5 and 6, comprising two adjacent magnetic poles, of angular width substantially equal to 120°, disc-shaped, adjacent, magnetized axially, and of alternate polarity, the said magnets 5 and 6, integral with a coupling means, being capable of being glued to rotor 15.

As in the foregoing, the device according to the invention functions in the same manner in this embodiment. Thus the stator is composed of two fixed parts 1 and 2, defining two secondary air gaps 7 and 8, whose parallel sides are oriented radially. The two secondary air gaps 7 and 8 are substantially perpendicular to main air gap 4, and magnetosensitive element 9, lodged in at least one of the said secondary air gaps 7, 8, measures the variation of induction. This magnetosensitive element 9 generates an electric signal proportional to the induction passing through it.

This version of the device according to the invention could contain, in common with all alternatives of the device according to the invention, at least one of the said magnetic poles 5, 6, that will be composed of a soft ferromagnetic material. In the same way, the opposite and parallel sides of secondary air gaps 7, 8 could be oriented in the same direction.

According to another option presented by the invention and illustrated in FIGS. 11 and 12, the angular-position magnetic-sensor device could, in all examples chosen to illustrate the said invention, contain these two magnetic poles 5, 6, independent of both rotor 3 and stator 1, 2. Thus the two said poles 5, 6 neither will be glued to the stator nor will be glued to the rotor, and will be able to move in independent fashion in the interior of the main air gap.

FIGS. 13 and 14 illustrate another version of the device of the invention wherein rotor 16 and 17, disposed in the interior of a stator 1, 2, is composed of two parts 16 and 17, to which there are glued magnetic poles 5 and 6 respectively. In addition, the two rotor parts 16, 17 are separated by an axially magnetized disc magnet 18.

Thus, according to the present embodiment, the position sensor is provided with a stator 1, 2, in the interior of which there is lodged a rotor divided into two parts 16 and 17, the two parts 16, 17 being separated axially by an axially magnetized disc magnet 18; in other words, the direction of magnetization thereof is parallel to stacking axis XX' of the two rotor parts 16 and 17 and of the said disc magnet 18. The space existing between stator 1, 2 and rotor 16, 17 defines main air gap 4, which extends over 360° and in which there move two magnetic poles 5, 6, made of soft ferromagnetic material, of alternate polarities, the said magnetic poles 5, 6, which are integral with a coupling means, being capable of being glued to the rotor or of comprising a fraction of each of rotor parts 16 and 17.

As in the other embodiments of the device according to the invention, the stator is composed of two fixed parts 1 and 2, defining two secondary air gaps 7, 8, whose parallel sides are oriented radially. The two secondary air gaps 7, 8 are substantially perpendicular to main air gap 4, and magnetosensitive element 9, lodged in at least one of the said secondary air gaps 7, 8, measures the variation of induction. This magnetosensitive element 9 generates an electric signal proportional to the induction passing through it.

As illustrated in FIG. 15, the two rotor parts 19, 20 could be disposed in the same plane, also containing stator 1, 2. In this version of the device of the invention, the two rotor parts 19, 20 will each comprise a magnetic pole, glued to the said part 19 or 20, for example, and will be separated from one another by a parallelepiped magnet 21, which is magnetized transversely, or in other words along the said plane and perpendicular to the tangents to the circle or portion of a circle formed by stator 1, 2 or the two rotor parts 19, 20.

The other elements of the angular-position magnetic-sensor device according to the invention can be disposed in a manner identical to that in the versions described in the foregoing. Thus, the stator 1, 2 is composed of two fixed parts 1 and 2, defining two secondary air gaps 7, 8, whose parallel sides are oriented radially. The two secondary air gaps 7, 8 are substantially perpendicular to main air gap 4, and magnetosensitive element 9, lodged in at least one of the said secondary air gaps 7, 8, measures the variation of induction. This magnetosensitive element 9 generates an electric signal proportional to the induction passing through it.

FIGS. 16 and 17 illustrate a version of the device of the invention wherein stator 22, 23 is placed in the interior of a rotor divided into two parts 24 and 25, these two parts 24, 25 being separated axially by an annular magnet 26 that is magnetized axially, or in other words in the direction parallel to the stack of circles or rings formed by rotor parts 24, 25 and annular magnet 26 separating them. The space between stator 22, 23 and rotor 24, 25 defines main air gap 4, which extends over 360° and in which there move two magnetic poles 5, 6, which are made of soft ferromagnetic material, of alternate polarities.

Magnetic poles 5, 6 could be integral with a means for coupling with rotor parts 24, 25, for example glued to the said parts 24 and 25 or comprise a fraction of the said rotor parts 24, 25. In the case illustrated in FIGS. 16 and 17, each rotor part 24 and 25 comprises or supports a magnetic pole 5 or 6.

Stator 22, 23 in this case is composed of two fixed parts 22 and 23, defining a secondary air gap 27, whose two ends are substantially perpendicular to main air gap 4. Magnetosensitive element 9, lodged in secondary air gap 27, measures the variation of induction. As in the foregoing, this magnetosensitive element 9 generates an electric signal proportional to the induction passing through it.

FIG. 18 illustrates, as in the example illustrated in FIG. 15, the two rotor parts 28, 29, disposed in the same plane, also containing stator 30, 31, disposed in the interior of the circle or of the ring formed by the two rotor parts 28, 29. The two rotor parts 28, 29 each comprise a magnetic pole 5, 6, and they will be separated from one another by a magnet 32, which has parallelepiped shape, for example, magnetized transversely, or in other words along the said plane and perpendicular to the tangents to the circle or portion of a circle formed by stator 30, 31 or the two rotor parts 28, 29.

In this example, stator 30, 31 is also composed of two fixed parts 30 and 31, defining a secondary air gap, whose two ends are substantially perpendicular to the main air gap. Magnetosensitive element 9, lodged in the secondary air gap, measures the variation of induction in the same manner as in the other practical examples of the invention.

The invention is described in the foregoing by way of example. It is understood that the person skilled in the art is capable of achieving different versions of the leaktight device according to the invention, especially as regards the form of the stator and/or of the rotor, and of the main and secondary air gaps, without departing from the scope of the patent as a result.

The invention claimed is:

1. An angular-position magnetic-sensor device comprising:
    a stator and a rotor, wherein the rotor is made of a ferromagnetic material and disposed in an interior of the stator, said rotor including two rotor parts that each include a magnetic pole, and said two rotor parts are separated from one another by a magnet;
    a space between said stator and a magnetized portion of said rotor, defining over substantially 360°, as a main air gap; and
    said stator including two secondary air gaps, wherein at least one of the two secondary air gaps includes a magnetosensitive element, and entire sides of said two secondary air gaps respectively extend according to two parallel straight lines, wherein said stator includes two pole shoes having angular widths that are substantially equal to 120° and 240° respectively that surround the rotor.

2. The angular-position magnetic-sensor device according to claim 1, wherein the sides of said secondary air gaps are oriented radially.

3. The angular-position magnetic-sensor device according to claim 1, wherein the rotor and the stator are disposed axially.

4. The angular-position magnetic-sensor device according to claim 1, wherein the two rotor parts forming the rotor are separated by an axially magnetized disc magnet.

5. The angular-position magnetic-sensor device according to claim 1, wherein the two rotor parts of the rotor are two transversely separate parts.

6. The angular-position magnetic-sensor device according to claim 5, wherein the two rotor parts of the rotor are separated by a transversely magnetized parallelepiped magnet.

7. The angular-position magnetic-sensor device according to claim 1, wherein the two rotor parts of the rotor are separated by an axially magnetized annular magnet.

8. The angular-position magnetic-sensor device according to claim 1, wherein the magnet has a parallelepiped shape.

* * * * *